United States Patent [19]
Province

[11] 3,802,943
[45] Apr. 9, 1974

[54] HEATING PLATEN HAVING IMPROVED VENTING MEANS

[75] Inventor: William F. Province, Bartlesville, Okla.

[73] Assignee: The Ridge Tool Company, Bartlesville, Okla.

[22] Filed: Apr. 17, 1972

[21] Appl. No.: 244,507

[52] U.S. Cl.............. 156/583, 219/228, 219/243
[51] Int. Cl. ................... B32b 31/00, H05b 1/00
[58] Field of Search ........... 156/583, 579; 219/228, 219/243, 230

[56] References Cited
UNITED STATES PATENTS
3,419,939   1/1969   Shelby ........................... 219/243
2,960,147   11/1960  Ferrell ........................... 156/583
2,142,150   1/1939   Replogle ......................... 156/583
3,075,573   1/1963   Piazze ............................ 156/583
3,719,792   3/1973   Cuccaro .......................... 219/228

Primary Examiner—Douglas J. Drummond
Attorney, Agent, or Firm—Head & Johnson

[57] ABSTRACT

A heating platen for use in fusion welding of plastic tubular plastic members including a metal plate having at least one surface configured to heat the exposed end surface of a tubular plastic member to fusion temperature, the plate having a threaded opening therethrough, and a venting screw received in the threaded opening having an axial opening therein permitting the flow of air therethrough when the plate is in engagement with the tubular plastic member.

2 Claims, 3 Drawing Figures

PATENTED APR 9 1974   3,802,943

HEATING PLATEN HAVING IMPROVED VENTING MEANS

BACKGROUND, SUMMARY AND OBJECTS OF THE INVENTION

In the use of thermoplastic tubular products, the joining of one element to another is frequently accomplished by heat fusion of the elements. As an example, when an end cap, tee, ell, or so forth, is to be joined to a length of pipe, or any other tubular thermoplastic element, the exposed ends of the tubular members are brought to fusion temperature by means of a platen. The platen is removed and the exposed ends, while at such fusion temperature, are joined together and permitted to cool. Upon cooling the thermoplastic elements are fused together and if the fusion process is carried out properly, the fused joint has as much strength, or even greater strength, than the thermoplastic elements themselves.

The heated platen is brought to sufficient temperature either by subjecting the platen to a gas flame, such as supplied from a liquified petroleum gas source, or by electric resistance heating. Some tubular elements are butt fused, that is, fused by heating each tubular end of the two elements to be joined against a plate having paralleled flat surfaces. Other fusion processes include the arrangement wherein a female shaped configuration is heated on one tubular element and a male shaped configuration is heated on the other element.

In the process of heating a thermoplastic element to fusion temperature if the element is closed, such as an end cap or the like, the gas within the element is heated and caused to expand. During this expansion process if some means is not provided for venting the expanding gas it will leak between the surface being brought to temperature and the heated platen, tending to force the surface away from the heated platen by the escaping gas, which can sometimes cause defective heating of the element. At other times the heated gas escapes, and any slight cooling which occurs prior to the withdrawal of the thermoplastic element from the platen forms a partial vacuum, making it difficult to withdraw the platen from the heated element. This is true because the melted plastic forms a seal with the platen face.

For these reasons it is important to provide ventilation through a heated platen to permit the escape of heated air within an enclosed plastic element. The ventilating arrangements used at the present time have not been completely successful in that they tend to become clogged with melted plastic, which thereby destroys their effectiveness. In addition, the expense of providing such passages in platens for varying pipe sizes sometimes becomes prohibitive.

This invention provides a means of overcoming the problems of the known means of ventilation of heated platens.

It is therefore an object of this invention to provide an improved means for venting a heated platen as used in joining thermoplastic tubular elements.

Another object of this invention is to provide an improved platen for use in joining thermoplastic heating elements, including improved means providing ventilation through the platen in an arrangement wherein ventilation is provided in the same manner regardless of changes in the size of tubular elements being heated.

These and other objects will be fulfilled in the description and claims to follow, taken in conjunction with the attached drawings.

DESCRIPTION OF VIEWS

FIG. 1 is a cross-sectional view of a platen embodying this invention as used in heating thermoplastic tubular elements for subsequent fusion of the elements together. In the arrangement shown the platen is of a type having a configuration at one side forming a female heated face which is interchangeable for different pipe sizes and providing a male face on the opposite side which is likewise interchangeable, and including improved means for providing ventilation through the heated platen.

DETAILED DESCRIPTION

Figure 1:
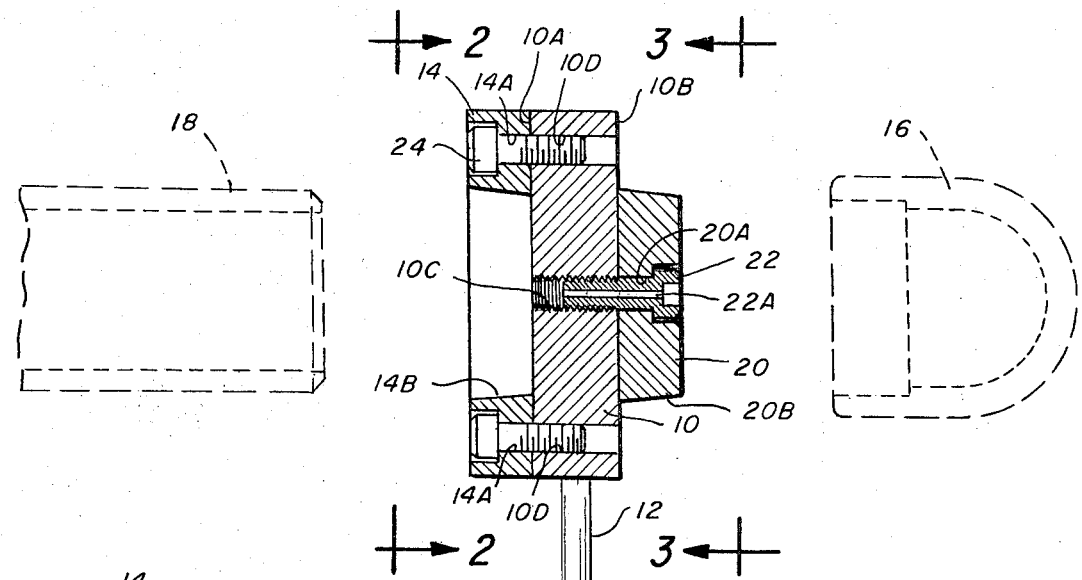

Referring to the drawings, and first to FIG. 1, a platen embodying the invention is shown. The plate includes a plate 10 having a first side 10A and an opposite paralleled side 10B. Plate 10 includes means (not shown but common in the art) for being heated, such as by electricity or gas. The plate 10 may be moved into and out of position between thermoplastic elements to be joined such as by use of handle 12.

Plate 10 may be utilized for butt welding adjacent tubular thermoplastic elements. In this application the planar opposed sides 10A and 10B are contacted by the tubular plastic members to be joined and the exposed end surfaces brought to fusion temperature. When the surfaces are sufficiently melted the platen is withdrawn and the two plastic elements are forced into contact with each other while the exposed surfaces are at fusion state. The elements are held in position until the exposed surfaces cool, thereby bonding the elements together.

As shown in FIG. 1, the platen is equipped to provide a male fused surface on one element to be joined and a female fused surface on the other. The male fused surface is accomplished by the utilization of a female heating face 14. The female heating face 14 is in the form of a ring having bolt openings 14A therein and providing a fusion surface 14B designed to provide the thermoplastic elements to be joined with the desired configuration. In the arrangement illustrated the platen is shown as it would be utilized to join an end cap 16 to a length of pipe 18, these elements being merely exemplary of any other type of tubular thermoplastic elements which may be joined together. In the illustrated embodiment, the face 10B of plate 10 has attached to it a male heating face 20. The male heating face 20 includes an opening 20A therein and has a peripheral configuration 20B designed to configure the heated surface of the plastic element 16 to that desired for fusion with the element 18. Plate 10 has a threaded opening 10C therein. A venting screw 22 is received in opening 20A and threadably engages the opening 10C in plate 10. Thus the screw 22 serves to hold the male heating face 20 to face 10B of plate 10.

When heating a closed element, such as the illustrated end cap 16, it is apparent that as heating takes place air trapped within the element will be heated and will expand. To afford a passageway for such air expansion screw 22 is provided with an axial opening 22A.

Thus gas or air headted within the element 16 can expand through opening 22A or contrarily, if cooling of the gas within element 16 occurs air may flow into the fitting through opening 22A. Thus, the provision of the venting screw 22 permits pressure equalization within the fitting 16.

Figure 2:
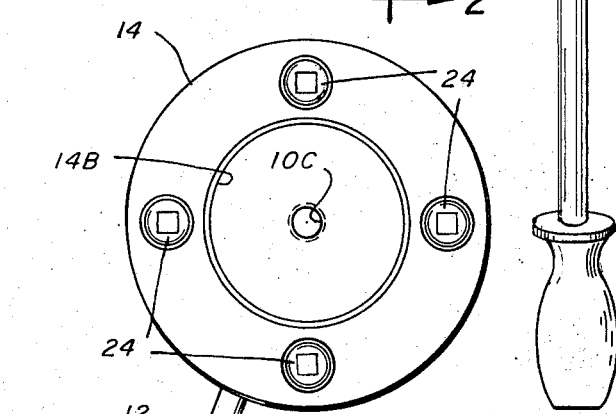
FIG. 2 is a front view of the heated platen of FIG. 1.
Figure 3:
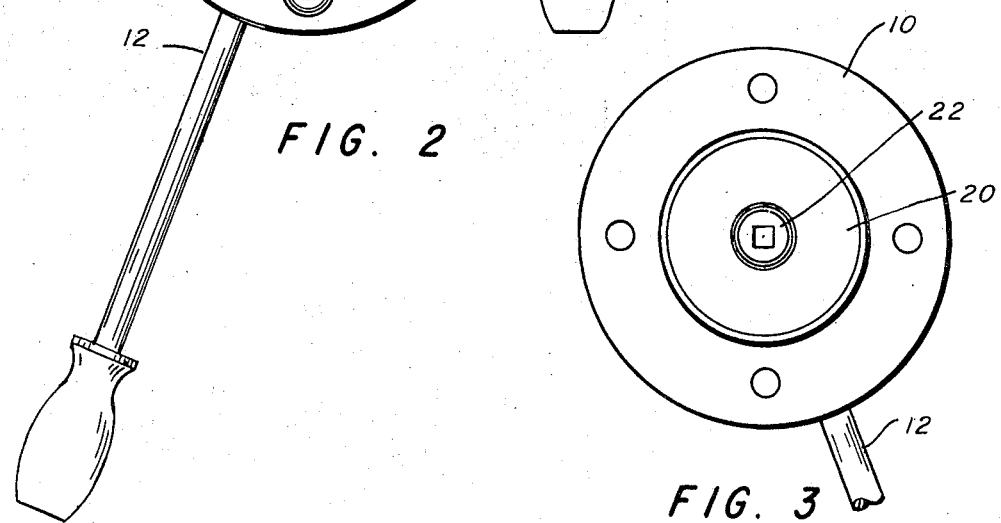
FIG. 3 is a back view of the platen of FIG. L.

FIGS. 2 and 3 show front and back views of the platen. The configuration of female heating face 14 and male heating face 20 may be changed, thereby enabling the heating platen to accommodate various diameters of tubular elements to be fused together.

The utilization of venting screw 22 has many advantages over the existing state of the art. First, by utilization of venting screw 22 it is unnecessary to provide venting passages in the heater faces. This is particularly important when the plate 10 is to be utilized for a variety of pipe sizes. Second, the utilization of venting screw 22 achieves a venting arrangement in a very economical manner. Third, the same size venting screw 22 may be used on many different sizes of plate 10 and heating faces 20. Fourth, there is less tendency for the heating passageway to become clogged. Fifth, the clogging of the venting screw passageway 22A can be easily cleaned, such as by use of a drill bit, or if necessary, discarded without and replaced. Sixth, there is no requirement for the alignment of heating passages between the plate 10 and any other elements, such as male heating face 20.

While a single venting screw 22 is shown it can be seen that if desired, such as with very large platens, more than one such screw may be utilized. If desired the same venting screw 20 may be utilized to hold the female heating face 14 in position.

Plate 10 includes threaded openings 10D at positions spaced from the center of the plate. Bolts 24 extend through openings 14A in female heating face 14. Bolts 24 thread into the openings 10D in plate 10 to hold the female heating face 14 in position.

While the invention has been described with a certain degree of particularity it is manifest that many changes may be made in the details of construction and the arrangement of components without departing from the spirit and scope of this disclosure. It is understood that the invention is not limited to the embodiment set forth herein for purposes of exemplification but is limited only by the scope of the attached claim or claims, including the full range of equivalency to which each element thereof is entitled.

What is claimed is:

1. A heating platen for use in bringing the exposed end portion of a tubular plastic member to fusion temperature, comprising:

a first heating portion having at least one surface configured to heat the exposed end surface of a tubular plastic member to fusion temperature, the first heating portion having a threaded opening therethrough within the area surrounded by the tubular plastic member when the heating platen is in use;

a second heating portion configured to heat the exposed end portion of a tubular plastic member to fusion temperature, the second heating portion having an opening therethrough; and a venting screw received in said opening in said second heating portion and threadably received in said opening in said first heating portion, said screw holding said second heating portion to said first heating portion, and said screw having an axial opening therethrough providing ventilation through said first and said second heating portions when said platen is in engagement with a tubular plastic member.

2. A heating platen according to claim 1 wherein said first heating portion is in the form of a metal plate having at least one surface configured to heat the exposed end surface of a tubular plastic member and wherein said second heating portion is a male portion having a periphery configured to heat the exposed end portion of the tubular plastic member to fusion temperature.

* * * * *